United States Patent

[11] 3,627,113

[72] Inventor Albert A. Di Ioia
Huntington Valley, Pa.
[21] Appl. No. 12,752
[22] Filed Feb. 19, 1970
[45] Patented Dec. 14, 1971
[73] Assignee Walco-Linck Corporation
Clifton, N.J.

[54] CASSETTE STORAGE AND CARRYING CASE
6 Claims, 8 Drawing Figs.

[52] U.S. Cl. .......... 206/1 R, 190/57, 217/18, 220/31 S, 220/94 A, B65d/81/00
[51] Int. Cl. .......... A45c 11/00, B65d 25/28, B65d 85/54, B65d 81/00
[50] Field of Search .......... 206/1 R, 52 F, 65 R, 46 H, 17, 16 R, 7.2; 220/31 S, 22, 94 A; 217/18, 19, 20; 190/57

[56] References Cited
UNITED STATES PATENTS

| | | | |
|---|---|---|---|
| 2,844,244 | 7/1958 | Hanson .......... | 206/17 |
| 3,499,525 | 3/1970 | Kanter .......... | 220/31 S |
| Des. 218,922 | 1970 | De Vore et al. .......... | 206/52 F |
| 3,561,004 | 2/1971 | Kozu et al. .......... | 206/1 R |

*Primary Examiner*—William T. Dixon, Jr.
*Attorney*—Curtis, Morris & Safford

ABSTRACT: A carrying case for a plurality of cassette type magnetic tape units in which the case has two hinged portions and means for interlocking the two portions together. A series of guides with retainers thereon are provided for holding the cassettes in place.

INVENTOR
ALBERT A. DI IOIA
BY
Curtis, Morris & Safford
ATTORNEYS

Patented Dec. 14, 1971 3,627,113

3 Sheets-Sheet 2

INVENTOR

ALBERT A. DI IOIA

BY

Curtis, Morris & Safford

ATTORNEYS

INVENTOR
ALBERT A. DI IOIA
BY
Curtis, Morris & Safford
ATTORNEYS

CASSETTE STORAGE AND CARRYING CASE

BACKGROUND OF THE INVENTION

This invention relates to a carrying case and storage unit for magnetic tape cartridges of the cassette type.

In recent years cartridges loaded with magnetic recording tape have become very popular for prerecorded music as well as for recording music off the air from radio broadcasts. One such cartridge is known as the "cassette" type. This cartridge consists of a small case unit having a pair of movable reels within and on the reels magnetic recording tape having a width of approximately an eighth of an inch is wound. Each cassette is about the size of a pack of cigarettes and is provided with two hub openings for rapid and easy engagement when the cassette is put into a player.

While cassettes have proven themselves to be very convenient and practical for recording, the storage of these units has been a problem. Due to the small size of the cassettes, they may easily be misplaced; or since they are provided with an open end to engage the driving capstan and the transducer for recording and playback, if left in the open they can become dirty and soiled.

One popular means of storing the cassette has been to place each cassette in a separate plastic box. While this protects the individual cassette it merely increases the storage problem since each cassette box is of necessity larger than the cassette and the same number of boxes have to be stored as formerly with cassettes except now the space requirements are greater.

SUMMARY OF THE INVENTION

An object of the present invention is to provide an improved and decorative storage container for a number of cassettes. In addition, the storage container is adaptable for carrying and may also be made to look like a book and stored on a shelf. Advantageously, the cassettes are stored in a manner so that they are retained in place and cushioned against shock as well as being insulated by an airgap to prevent damage from heat or cold or by a blow severe enough to indent the container walls.

DESCRIPTION OF THE PREFERRED EMBODIMENTS

Figure 1:
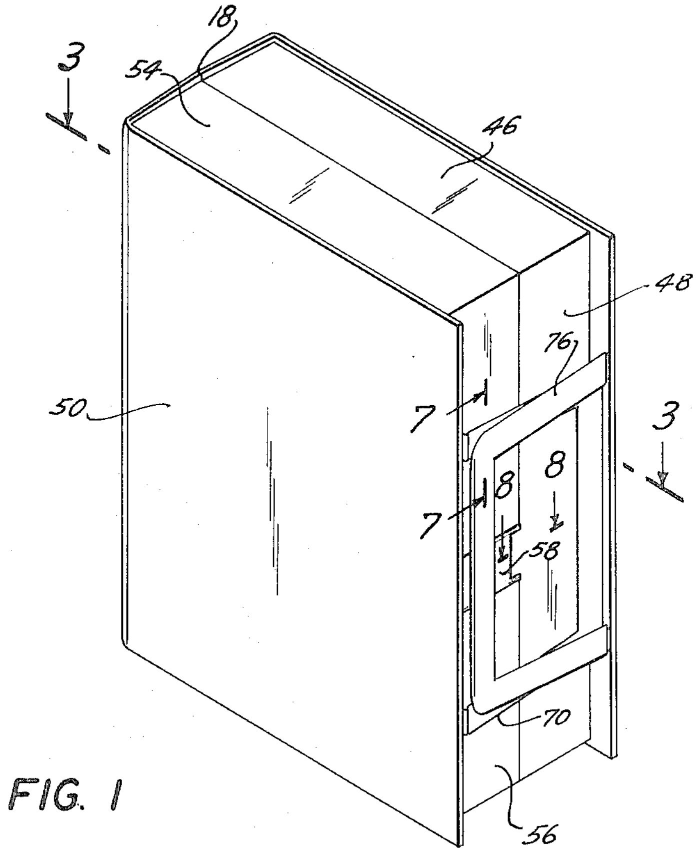
FIG. 1 is a perspective view showing the cassette carrying case and storage unit in a closed position.

Referring to the drawings and to FIGS. 1 through 4 in particular, a case 10 is shown. This case is particularly suited for the carrying and storing of magnetic tape cartridges of the cassette type. Hereafter the cartridges will be referred to as cassettes. Preferably the case is made from resilient but durable plastic materials, such as polypropylene, which may be readily molded to conform to the desired shape and dimensions.

The cassettes 12 are stored in one half of the case, called the holder 14. Attached to the holder is a cover half 16 and the two are joined together by a hinge 18. Preferably the hinge is molded integrally with the holder and cover to reduce the cost of molding and the amount of handling for assembly.

The holder 14 is divided into a first compartment 20 and a second compartment 22, the two compartments being formed by a separator 24. Spacers 26 in the holder portion cooperate with spacers 28 in the cover portion to position the stored cassettes 12 transversely. A series of stops 30 are also provided in the holder and these cooperate with the separator 24 to give longitudinal alignment and positioning to the stored cassettes.

Guides 32 are provided in the holder half and at each end of a row of guides, an end guide 34 is positioned. The guides 32 and 34 are spaced apart a slightly greater extent than the width of a standard cassette. Extending from the guides 32 and 34 are retainer elements 36 which engage hub openings 38 in the cassettes 12. Advantageously, the retainers 36 are positioned adjacent the beveled edge of the hub openings 38.

The retainers insure that the cassettes will remain in position and they cooperate with the spacers 26 and 28 as well as the separator 24 and the stops 30 to give overall proper positioning to the stored cassettes. Further, the retainers help to prevent the cassettes from falling out of the case when it is moved to the open position such as that shown in FIG. 2.

Figure 6:
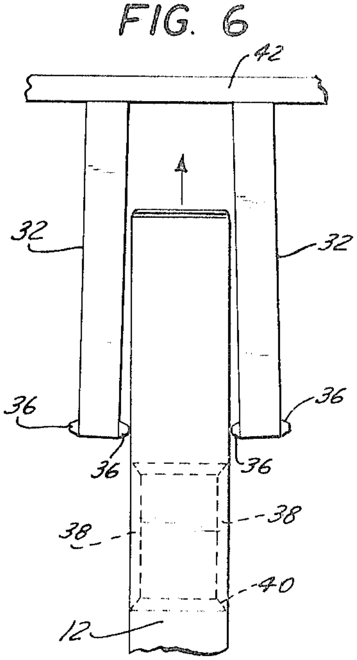
FIG. 6 is an enlarged view showing the resulting action of a cassette against adjacent retainer elements as the cassette is slipped into a storage space.
Figure 5:
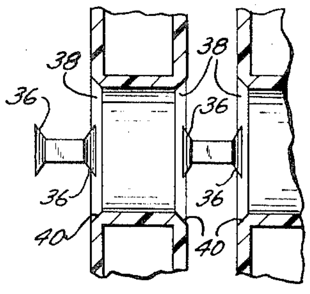
FIG. 5 is an enlarged sectional view along lines 5—5 of FIG. 4 showing the means for retaining the cassettes in place.

As shown in FIG. 6, the retainers are forced apart slightly by a cassette 12 being inserted between a pair of guides 32. When the cassette is in place the retainers 36 will return to their normal upright position due to the resiliency of the material from which the guides are made. In addition as a series of cassettes are stored, side-by-side, each cassette helps to align the retainer in a holding position with respect to transversely adjacent units.

The holder 14 includes an outer wall 42, a back or hinge wall 44, sidewalls 46 and a front wall 48. The cover 16 has similar walls consisting of an outer wall 50, a back or hinge wall 52, sidewalls 54 and a front wall 56. A recess 58 is provided in the front wall of the cover and at the end of the recess a lip 60 projects outwardly. On the front wall 48 of the holder 14 a tab 62 is provided also with a lip portion 64. Adjacent the tab 62 are guides 66. When the two halves 14 and 16 are closed to the position shown in FIG. 1, the lips 64 and 60 engage and, together with the guides 66, lock the holder and cover closed.

An extension 68 is provided on the outer wall 50 of the cover and a handle 70 projects therefrom. Advantageously, the handle is hinged to the extension 68 by means of a hinge element 72. A second extension 74 extends from the outer wall 42 of the holder. Attached thereto is a handle 76 which is hinged by an element 78. Extending from the handle 76 are posts 80, and tabs 82 extend from the post. When the handles are folded to the position shown in FIG. 1, the tabs 82 lock against the handle 70. Since the handles 70 and 76 have resilient hinges 72 and 78 respectively, the handles tend to spring apart. However, the tabs 82 hold them in place and, advantageously, the resiliency of the handles makes the tabs 82 more effective.

Figure 3:
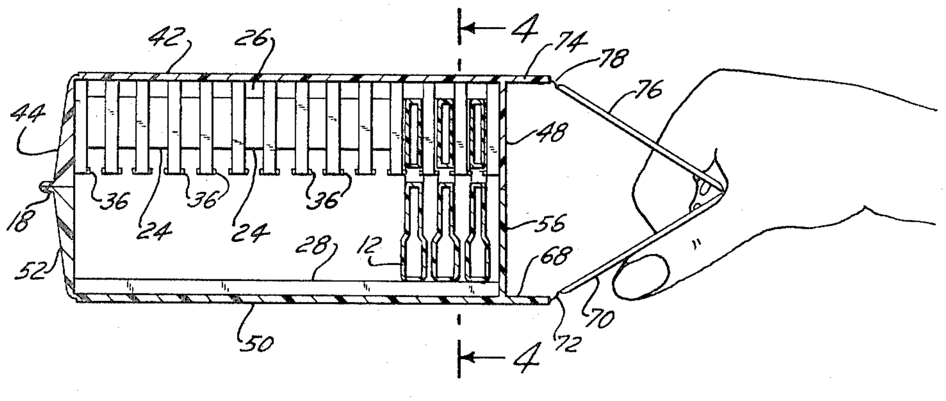
FIG. 3 is a sectional view along lines 3—3 of FIG. 1 with the handles of the case extended to demonstrate how it may be carried.
Figure 2:
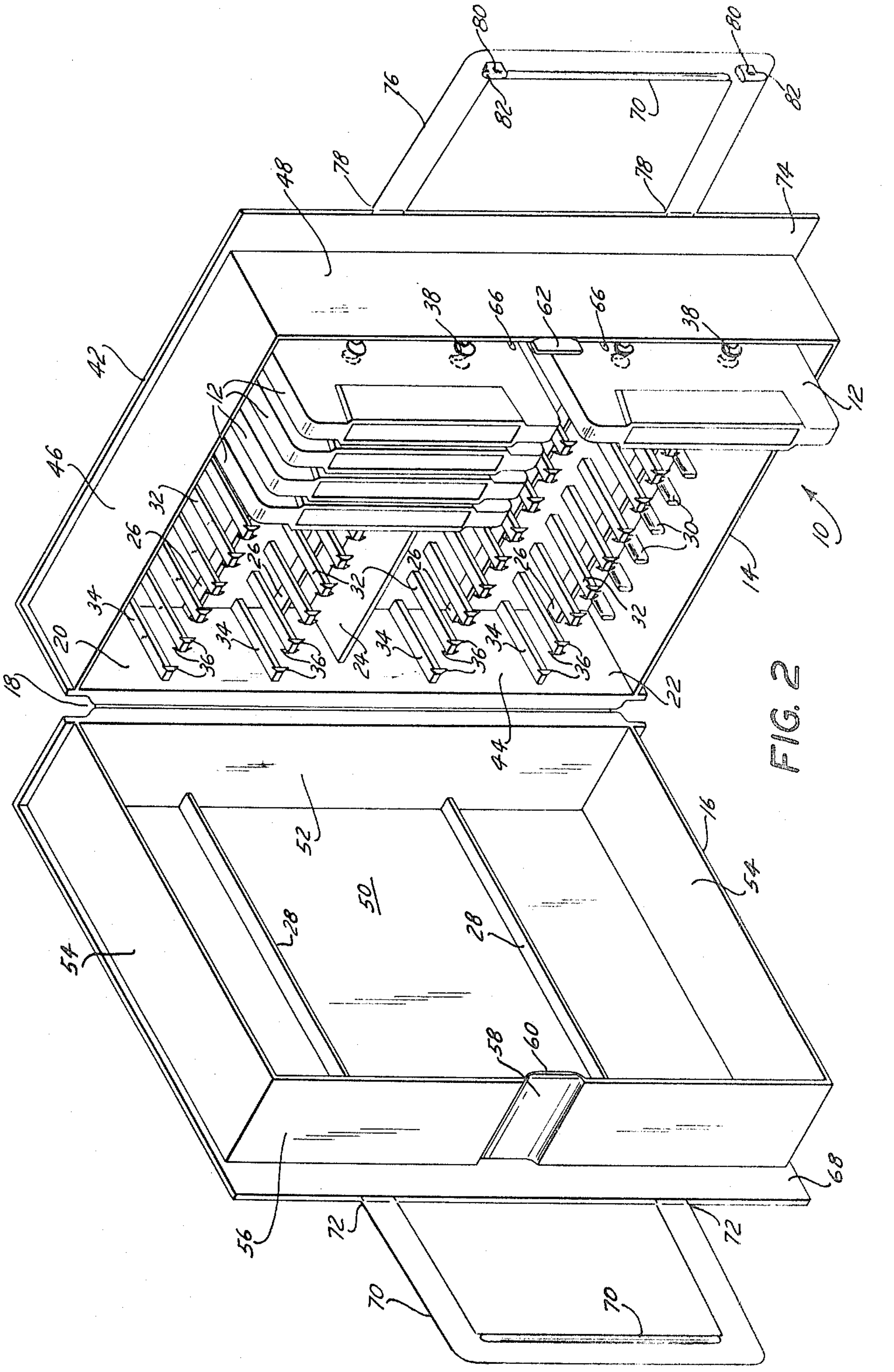
FIG. 2 is a perspective view of a cassette carrying case opened to expose the interior and show the location of cassettes stored therein.
Figure 4:
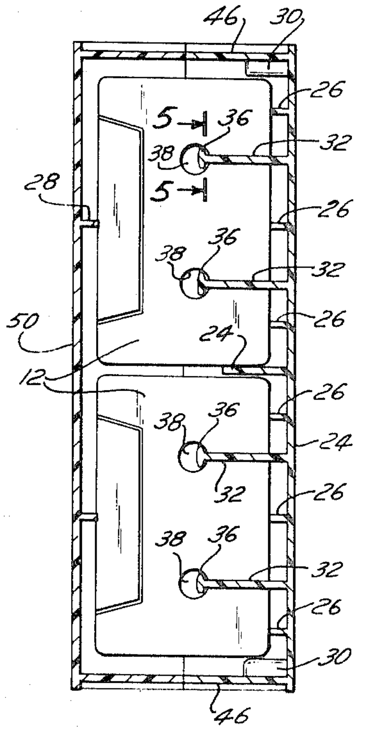
FIG. 4 is a sectional view along lines 4—4 of FIG. 3 showing the cassettes retained in place.
Figure 7:
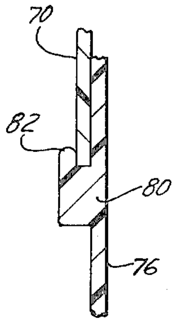
FIG. 7 is taken along lines 7—7 of FIG. 1 and shows the interlocking relationship between the two handles of the case.
Figure 8:
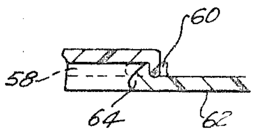
FIG. 8 is taken along lines 8—8 of FIG. 1 showing the locking means for the two halves of the case.

When the case 10 is used for carrying as shown in FIG. 3, the handles are reinforced by means of ribs 84. The ribs 84 also cushion the hand of the carrier and prevents a sharp edge portion from being presented to the user.

It will be apparent to those skilled in the art that the illustrated carrying case will also serve as a decorative storage element. In order to enhance its appearance it may be embossed and fixed with a label or a title which will give it an appearance similar to that of a book.

What is claimed is:

1. A combination of a case and a plurality of magnetic tape cassettes of the type having hub openings therein comprising:
   1. a holder portion having an outer wall, sidewalls, back and front walls joined together to form an open top unit;
   2. a cover portion having an outer wall, sidewalls, back and front walls joined together to form an open top unit;
   3. a hinge member integrally joined to the backwalls of the holder and cover portions whereby said portions may be moved together to form a closed unit;

4. a plurality of guide members normal to the inner surface of the outer wall of the holder unit, said members spaced apart a sufficient distance to permit a cassette to be passed therebetween;
5. retainers extending from the guide members and adapted to engage an adjacent cassette at the hub openings; and
6. spacer means for maintaining cassettes held therein in spaced relation from the outer walls, sidewalls, back and front walls of the cover and holder whereby an insulating airgap is provided about the cassettes and they are supported against shock.

2. A case as defined in claim 1 and further including spacers mounted on the inner surfaces of the cover and the holder for cooperation with the guide members and retainers to hold the cassettes in place.

3. A case as defined in claim 1 and further including latch means on the front walls of the holder and cover portions and adapted to fit together in holding relation.

4. A case as defined in claim 1 including handles extending from the outer walls of the holder and cover portions and having engagement means on at least one of said handles for interlocking said handles together.

5. A case as defined in claim 4 wherein said handles are U-shaped and have a supporting rib on the grip portion of the handle.

6. A case as defined in claim 1 wherein the case is molded as an integral unit from polypropylene.

* * * * *